United States Patent
Larsen et al.

(10) Patent No.: US 11,817,813 B2
(45) Date of Patent: Nov. 14, 2023

(54) WIND TURBINE ELECTRIC FILTER COMPRISING FILTER MODULES ARRANGED AT DIFFERENT PLATFORM HEIGHTS INSIDE A WIND TURBINE TOWER

(71) Applicant: General Electric Renovables Espana, S.L., Barcelona (ES)

(72) Inventors: Einar V. Larsen, Ballston Lake, NY (US); Regis Peron, Nantes (FR); Javier Cilla Garcia, Barcelona (ES); Vincent Kerbouriou, Nantes (FR)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/709,559

(22) Filed: Mar. 31, 2022

(65) Prior Publication Data
US 2022/0321042 A1    Oct. 6, 2022

(30) Foreign Application Priority Data
Apr. 1, 2021   (EP) .................................... 21382277

(51) Int. Cl.
*H02P 9/10* (2006.01)
*F03D 80/80* (2016.01)
(Continued)

(52) U.S. Cl.
CPC ................ *H02P 9/102* (2013.01); *F03D 9/25* (2016.05); *F03D 80/80* (2016.05); *H02P 2101/15* (2015.01)

(58) Field of Classification Search
None
See application file for complete search history.

(56) References Cited

U.S. PATENT DOCUMENTS 7,071,579 B2   7/2006 Erdman et al.
8,319,374 B2 * 11/2012 Wang ........................ H02J 3/40
                                                  363/71
(Continued)

FOREIGN PATENT DOCUMENTS

DE   102018002984 A1   10/2019
EP        2567438 A2    3/2013
(Continued)

OTHER PUBLICATIONS

European Search Report Corresponding to EP213822778 dated Sep. 28, 2021.
(Continued)

*Primary Examiner* — Tulsidas C Patel
*Assistant Examiner* — S. Mikailoff
(74) *Attorney, Agent, or Firm* — Dority & Manning, P.A.

(57) ABSTRACT

The present disclosure relates to a wind turbine comprising a wind turbine rotor with a plurality of blades supported on a support structure, a generator operatively coupled to the wind turbine rotor for generating electrical power, a power electronic converter for converting electrical power generated by the generator to a converted AC power of predetermined frequency and voltage, and a main wind turbine transformer having a low voltage side and a high voltage side for transforming the converted AC power to a higher voltage. One or more electric filters are connected to the high voltage side of the main transformer, wherein the electric filters are arranged in the support structure. The present disclosure also relates to wind farms, and particularly offshore wind farms, and to methods for operating wind farms.

12 Claims, 7 Drawing Sheets

(51) Int. Cl.
*F03D 9/25* (2016.01)
*H02P 101/15* (2016.01)

(56) References Cited

U.S. PATENT DOCUMENTS

| | | | |
|---|---|---|---|
| 8,405,251 | B2 | 3/2013 | Barton et al. |
| 9,065,329 | B2 | 6/2015 | Kjaer et al. |
| 9,442,137 | B2 | 9/2016 | Nielsen |
| 9,911,528 | B2 | 3/2018 | Hillebrandt et al. |
| 10,879,783 | B2 | 12/2020 | Letas |
| 2007/0024058 | A1 | 2/2007 | McClintic |
| 2011/0049994 | A1* | 3/2011 | Hiller ............... F03D 9/25 363/35 |
| 2012/0019007 | A1 | 1/2012 | Nelson et al. |
| 2015/0001848 | A1 | 1/2015 | Imaie et al. |
| 2018/0340519 | A1* | 11/2018 | Schult ............... F03D 80/60 |
| 2021/0047997 | A1* | 2/2021 | Abeyasekera ......... F03D 7/026 |
| 2022/0321042 | A1* | 10/2022 | Larsen ............... H02P 9/102 |

FOREIGN PATENT DOCUMENTS

| | | |
|---|---|---|
| EP | 2771894 A1 | 9/2014 |
| EP | 2806159 A1 | 11/2014 |
| EP | 2209200 B1 | 7/2015 |
| EP | 2800224 B1 | 8/2017 |
| EP | 2505832 B1 | 8/2018 |
| EP | 2386137 B1 | 3/2019 |
| EP | 3460970 A1 | 3/2019 |

OTHER PUBLICATIONS

Cigre, AC Side Harmonics and Appropriate Harmonic Limits for VSC HVDC, Reference 754, Technical Brochures, 2019. (Abstract Only) https://e-cigre.org/publication/754-ac-side-harmonics-and-appropriate-harmonic-limits-for-vsc-hvdc.

* cited by examiner

WIND TURBINE ELECTRIC FILTER COMPRISING FILTER MODULES ARRANGED AT DIFFERENT PLATFORM HEIGHTS INSIDE A WIND TURBINE TOWER

The present disclosure relates to wind turbines, in particular to electric filters for use in combination with wind turbines. The present disclosure further relates to wind turbines, and wind farms with such electric filters.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly or through a gearbox. This way, the generator produces electricity which can be supplied to the electrical grid.

The wind turbine hub may be rotatably coupled to a front of the nacelle. The wind turbine hub may be connected to a rotor shaft, and the rotor shaft may then be rotatably mounted in the nacelle using one or more rotor shaft bearings arranged in a frame inside the nacelle. The nacelle is a housing arranged on top of a wind turbine tower that contains and protects e.g. the gearbox (if present) and the generator and, depending on the wind turbine, further components such as a power converter, and auxiliary systems.

Wind turbines are often grouped together in so-called "wind farms". Wind farms comprise a plurality of wind turbines. These wind turbines may be connected to a local (internal) electrical grid of the wind farm. The internal grid of the wind farm may comprise a plurality of strings, and a number of wind turbines can be connected to each of these strings. This electrical grid of the wind farm may be connected to a main power grid at a point of common coupling (PCC).

An important trend in the field of wind turbines is to place the turbines in offshore wind parks. Offshore wind parks may be connected to a mainland electrical grid through a high voltage transmission line, e.g., a High Voltage Alternating Current (HVAC) transmission or a High Voltage Direct Current (HVDC) transmission.

The wind turbines may supply power to the internal wind farm grid at a voltage of e.g., 33 kV or 66 kV. At a substation the voltage may be stepped up to several hundred kV with high voltage transformer(s). The high voltage electrical power may then be supplied to a high voltage transmission line connected to the mainland grid. The substation may also include e.g., circuit breakers, surge arresters, capacitor banks and other.

Several trends in the wind energy field lead to an increased need for the use of harmonics filters in wind farms, and specifically offshore wind farms. Wind farms may be placed at a large distance from the shore. Wind turbines have significantly increased in size and power output. Nominal power ratings for individual wind turbines of 5 MW, 7 MW, 10 MW and more are known. Because of the increase in size, wind turbines within a wind farm may be spaced at increased distances from each other, leading again to longer electrical cables.

With increasingly long transmission lines, and increasingly long cables, cable capacitance increases. Grouping together of large wind turbines in such wind farms creates a circuit where electrical resonance will occur between the capacitance of the cables and the inductive nature of the transformers of the substation and of the wind turbines. The frequency of these resonances varies depending upon the number of cables connected and the number of wind turbines in operation. These resonances, together with the harmonic emissions from the wind turbines, can cause excessive distortion at the PCC.

It is known in the art to include a filter for reducing harmonics at a substation of a wind farm. However, there are disadvantages (economic and other) to increasing the physical size of the installation to accommodate harmonic filters.

SUMMARY

In an aspect of the present disclosure, a wind turbine is provided, which comprises a wind turbine rotor with a plurality of blades supported on a support structure, and a generator operatively coupled to the wind turbine rotor for generating electrical power. The wind turbine further comprises a power electronic converter for converting electrical power generated by the generator to a converted AC power of predetermined frequency and voltage and a main wind turbine transformer having a low voltage side and a high voltage side for transforming the converted AC power to a higher voltage. The wind turbine further comprises one or more electric filters connected to the high voltage side of the main transformer, wherein the electric filters are arranged in the support structure.

According to this aspect, a wind turbine is provided with which an electric filter is arranged. In a wind farm, a number of wind turbines may be grouped together. By arranging an electric filter with one or more individual wind turbines, there is less need or no need for an electric filter at a substation. The electric filters are connected to the high voltage side of the main transformer and can provide effective damping of harmonics in the medium voltage line (e.g., 33 kV, 35 kV, 60 kV, 66 kV or even 132 kV) of a wind farm grid.

Electric filters may herein be regarded as any electrical circuit or arrangement connected to an electrical system that is configured to reduce distortions in the electrical systems. One of such distortions may be harmonics. And one type of electric filter that may be used within the scope of the present disclosure is a harmonic filter. Within the scope of the present disclosure, the electric filters may be e.g., damped filters configured to add damping to grid resonances or tuned filters or other.

A harmonic filter may herein be regarded as series or parallel resonant circuits designed to shunt or block harmonic currents (i.e., distortions with a frequency that are an integer multiple of the system's fundamental frequency). They are configured to reduce the harmonic currents flowing in the system (electrical grid, in particular the electrical grid of the wind farm) from the source and thereby reduce the harmonic voltage distortion in the system.

In a further aspect of the present disclosure, a wind farm is provided which comprises a substation with a common connection point, and one or more parallel wind farm strings connected to the common connection point, having a first end at or near the common connection point and a second opposite end, and including a plurality of wind turbines between the first end and the second end, wherein one or more of the wind farm strings includes at least one wind turbine with an electric filter connected at a high voltage side of a main transformer of the wind turbine.

In yet a further aspect of the present disclosure, a method for operating a wind farm comprising a plurality of wind turbines is provided. The method comprises disconnecting a wind turbine generator of a first wind turbine of the plurality of wind turbines from an electrical grid of the wind farm, wherein an electric filter arranged within a support structure of the first wind turbine remains connected to the electrical grid of the wind farm.

DETAILED DESCRIPTION OF EXAMPLES

Reference now will be made in detail to embodiments of the invention, one or more examples of which are illustrated in the drawings. Each example is provided by way of explanation of the invention, not as a limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
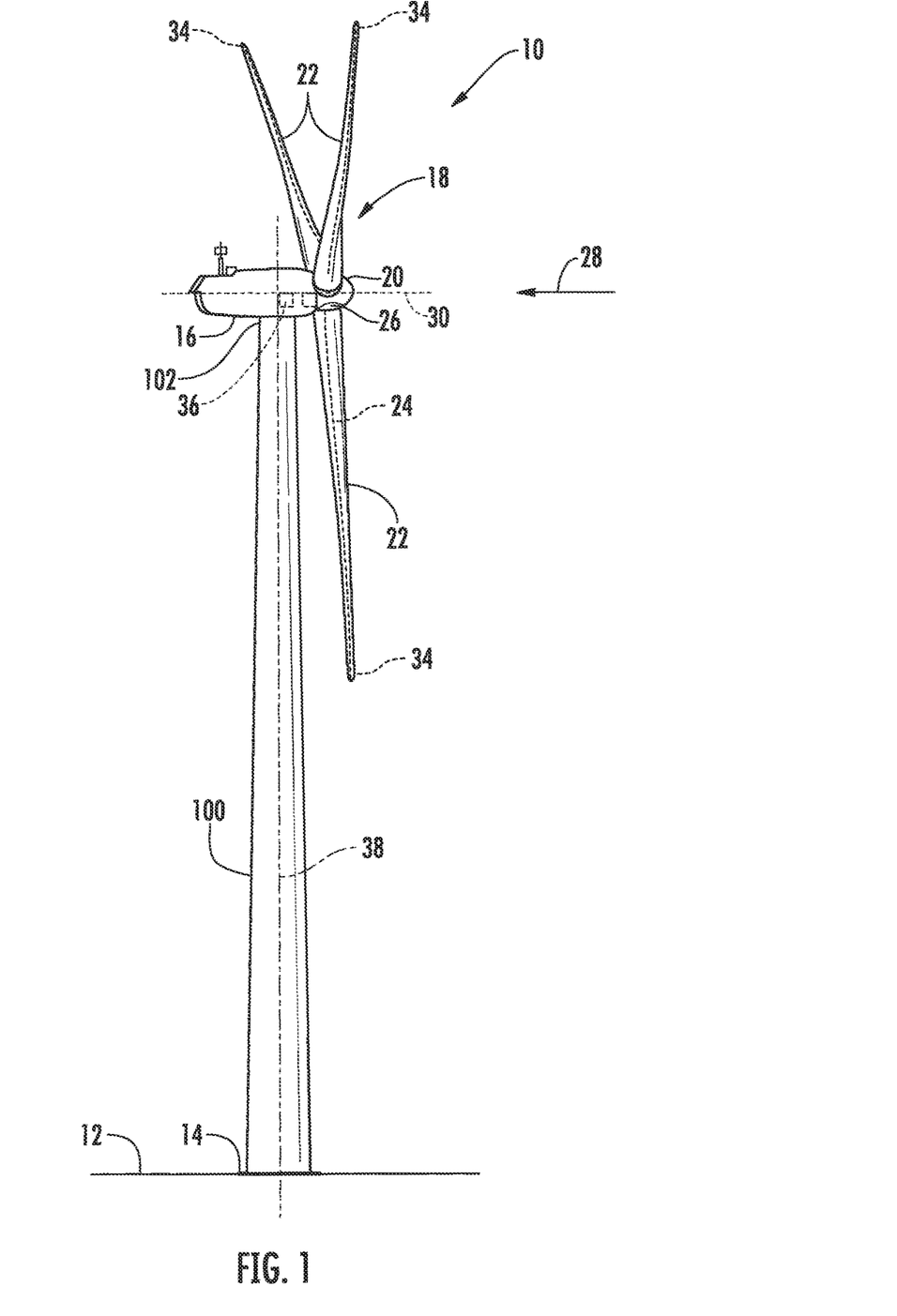
FIG. 1 schematically illustrates a perspective view of one example of a wind turbine.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 100 that extends from a support system 14 on a ground 12, a nacelle 16 mounted on tower 100, and a rotor 18 that is coupled to nacelle 16. FIG. 1 specifically depicts an onshore wind turbine, but the present disclosure also relates to offshore wind turbines.

The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 100 may be fabricated from tubular steel to define a cavity (not shown in FIG. 1) between a support system 14 and the nacelle 16 arranged at a top end 102 of tower 100. In an alternative embodiment, the tower 100 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system to control the load and power generated by the wind turbine 10 by adjusting an angular position of at least one rotor blade 22 relative to wind vectors. Pitch axes 34 of rotor blades 22 are shown. During operation of the wind turbine 10, the pitch system may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote control center. The wind turbine controller 36 includes a processor configured to perform the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

Figure 2:
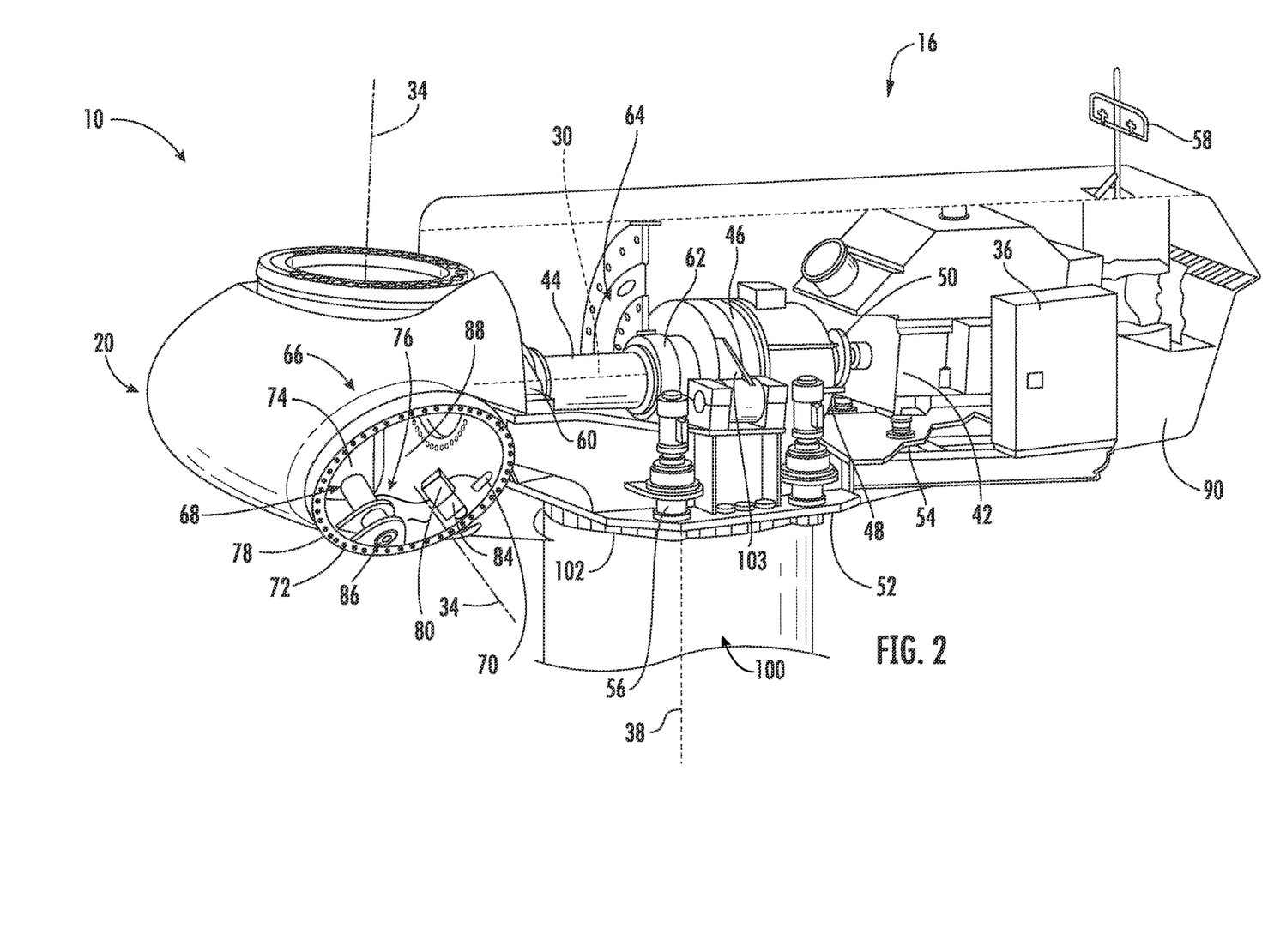
FIG. 2 illustrates a simplified, internal view of one example of the nacelle of the wind turbine of FIG. 1.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high speed shaft 48 by translating the relatively slow rotational movement of the rotor 18 and of the main shaft 44 into a relatively fast rotational movement of the high speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400V to 1000 V into electrical energy having medium voltage (e.g. 10-35 KV). Said electrical energy is conducted via power cables 160 from the nacelle 16 into the tower 100.

The gearbox 46, generator 42 in transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 100 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system which may include a wind vane and anemometer. The meteorological measurement system 58 can provide information to the wind turbine controller 36 that may include wind direction 28 and/or wind speed. In the example, the pitch system is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angel of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery, electric capacitors hence letter or an electrical generator driven by the rotation of the hub 20, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface of hub 20 and may be coupled, directly or indirectly, to outer surface.

Figure 3A:
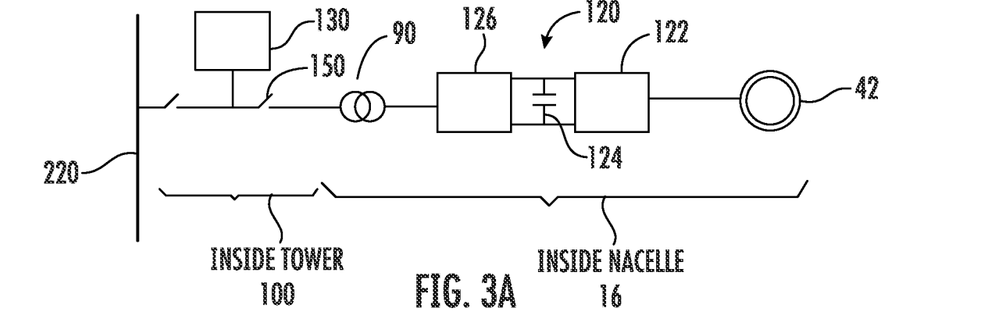
FIGS. 3A-3C schematically illustrate an example of an electrical connection of a wind turbine generator to an electrical grid.
Figure 3B:
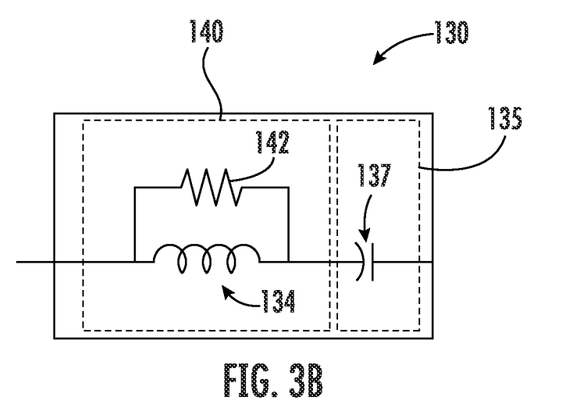
Figure 3C:
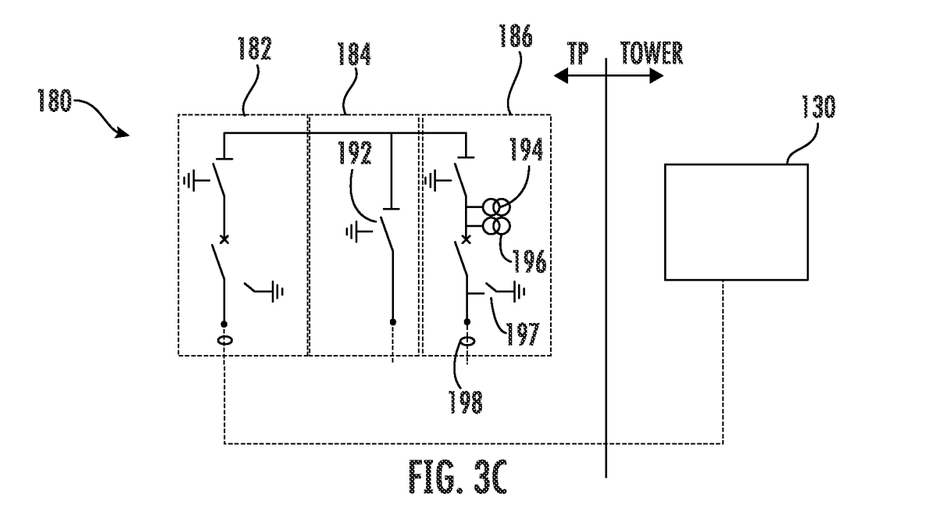

FIGS. 3A-3C schematically illustrate an example of an electrical connection of a wind turbine generator to a grid. In an aspect of the present disclosure, a wind turbine 10 is provided, which comprises (see e.g. FIGS. 1 and 2) a wind turbine rotor with a plurality of blades supported on a support structure. The wind turbine further comprises a generator 42 operatively coupled to the wind turbine rotor for generating electrical power. The wind turbine further comprises a power electronic converter 120 for converting electrical power generated by the generator to a converted AC power of predetermined frequency and voltage. The wind turbine further comprises a main wind turbine transformer 90 having a low voltage side and a high voltage side for transforming the converted AC power to a higher voltage. And according to this aspect, the wind turbine 10 comprises one or more electric filters 130 connected to the high voltage side of the main transformer 90, wherein the electric filters are arranged in the support structure.

The support structure of a wind turbine may have different configurations, particularly depending on whether the wind turbine is an offshore wind turbine or an onshore wind turbine. In the case of offshore wind turbines, wind turbines may be floating or on a foundation in the seabed. The support structure of the wind turbine supporting a wind turbine rotor may include, a nacelle 16 with one or more load carrying frames (like in FIG. 2), a wind turbine tower 12, and a tower support including a transition piece, a platform arranged at the interface of the tower and the transition piece and a foundation. Depending on the type of wind turbine, the support structure may include a monopile foundation, a jacket structure, or other.

The wind turbine of FIG. 3 may be an offshore wind turbine. The generator may have different topologies. In the particular example of FIG. 3, generator 42 may be a permanent magnet generator. The generator rotor may carry a plurality of permanent magnets, or permanent magnet modules at a rotor rim, and the stator may have a plurality of electrical coils. A radial air gap may be arranged between the generator rotor and generator stator. The permanent magnet generator 42 may be directly driven by the wind turbine rotor.

In other examples, other generator topologies may be used, e.g. a wind turbine generator may be a Doubly Fed Induction Generator (DIFG). Also, the power converters may have different configurations. In the particular example of FIG. 3, the power converter 120 includes an AC/DC converter 122, a DC link 124, and a DC/AC inverter 126. The power converter 120 may be a full power converter.

The output of the power converter may be electrical power of a predetermined frequency and voltage. Power converters for wind turbines may typically be low voltage or medium voltage. Low voltage power converters typically are configured to deliver electrical power of a voltage below 1 kV, e.g. 575V or 690 V. A medium voltage power converter may be configured to deliver electrical power of a voltage of more than 1 kV. The output voltage of the power converter may be stepped up to e.g. 33 kV or 66 kV by the main (voltage) transformer of the wind turbine for delivery to the wind park grid 220. The electric filter 130 is connected at a high voltage side of the main transformer.

In the example of FIG. 3A, the support structure includes a wind turbine tower 100, and the electric filters are arranged inside the wind turbine tower 100. As illustrated in FIG. 3A, the generator 42, power converter 120 and main transformer 90 may be arranged within the wind turbine nacelle 16.

One or more circuit breakers 150 or switches may be provided as well. In this particular example may be connected between the electrical grid 220 and the circuit breaker 150 of the main transformer. With such an arrangement, the wind turbine can be disconnected from the grid (i.e. wind turbine generator, converter and transformer), whereas the filter can stay connected and reduce distortions on the grid 220 or the bus or string of the grid 220 that the filter is connected to.

In examples, the electric filters 130 may be damped filters. A damped filter may herein be regarded as a electric filter configured to reduce or avoid harmonics at a relatively wide variety of frequencies. In other examples, the electric filters may be tuned filters configured to filter out a specific frequency or a specific frequency band. The electric filter of FIG. 3B includes a reactor bank 134 and a resistor bank 142 connected in parallel. The electric filter 130 further includes a capacitor bank 137 connected in series with the reactor bank 134 and resistor bank 142. In examples, one or more of the electric filters may comprise two filter modules 140, 135. In FIG. 3B, the first module 140 comprises a reactor bank and a resistor bank connected in parallel, and the second module 135 comprises a capacitor bank, and wherein the second module is connected in series with the first module.

The electric filters may be so-called passive filters including resistors, inductors, and capacitors. Alternatively, the electric filters may be active filters using active components such as different types of BJTs, IGBTs, MOSFETs and integrated circuits. In examples, the filters may be e.g. low pass filters, bandpass filters, or notch filters. The filters may be LC filters. The generator may be configured to generate electrical power of a plurality of electrical phases (e.g. three phases, six phases, nine phases or other), and the wind turbine may comprise a electric filter for each of the plurality of electrical phases.

The electric filters 130 may be connected to the grid via a switchgear 180. A switchgear may be composed of electrical disconnect switches, fuses or circuit breakers used to control, protect and isolate electrical equipment. In the example of FIG. 3, the support structure may comprise a transition piece TP, and the switchgear may be arranged in the transition piece. Therefore, in some examples, the generator, power converter and main voltage transformer may be arranged in the wind turbine nacelle, the electric filter(s) may be distributed along the height of the tower, and the switchgear may be arranged in a transition piece. In alternative examples, switchgear and filters may be arranged in the tower. In further alternative examples, the filters may be arranged in the transition piece.

The electric filter 130 may be connected with a switchgear in a variety of manners. The configuration inter alia may depend on a position of a wind turbine within a wind farm. In the example of FIG. 3C, the wind turbine may be arranged at an end of a string in a wind farm. In such a position, a switchgear may need one less bay, so that a bay can be used for connection to an electric filter.

The switchgear 180 may include a feeder bay 184, a transformer bay 186, and a filter bay 182. Schematically shown in FIG. 3C are a disconnector and earthing switch 192, earthing switch 197, current transformer 198, voltage transformer 194, and service voltage transformer 196. Within the scope of the present disclosure, any suitable switchgear may be used, and the connection of the electric filter(s) to the switchgear may be done in a wide variety of ways.

It should be appreciated that the electrical connection of a wind turbine generator to a grid may be more complex than what is depicted in FIG. 3A. In particular, auxiliary transformers for connecting to auxiliary systems of the wind turbine, fuses and circuit breakers have been left out in order not to unduly complicate FIG. 3A.

Figure 3D:
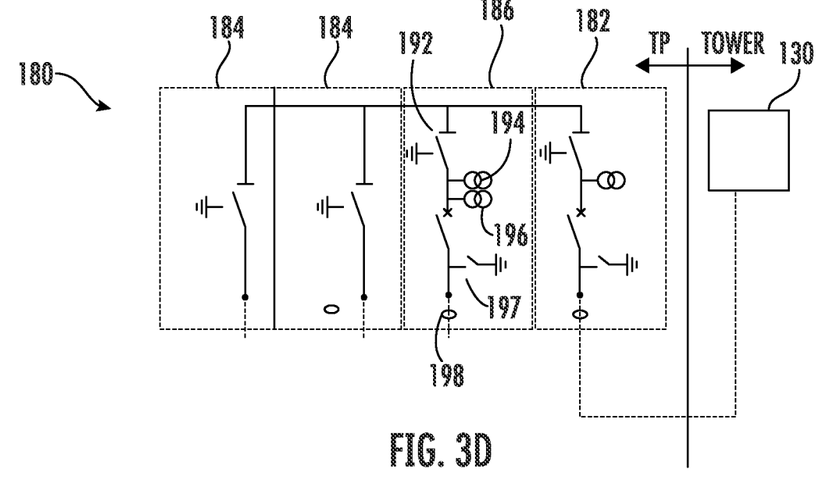
FIGS. 3D and 3E schematically illustrate two alternative connections of an electric filter to a switchgear.
Figure 3E:
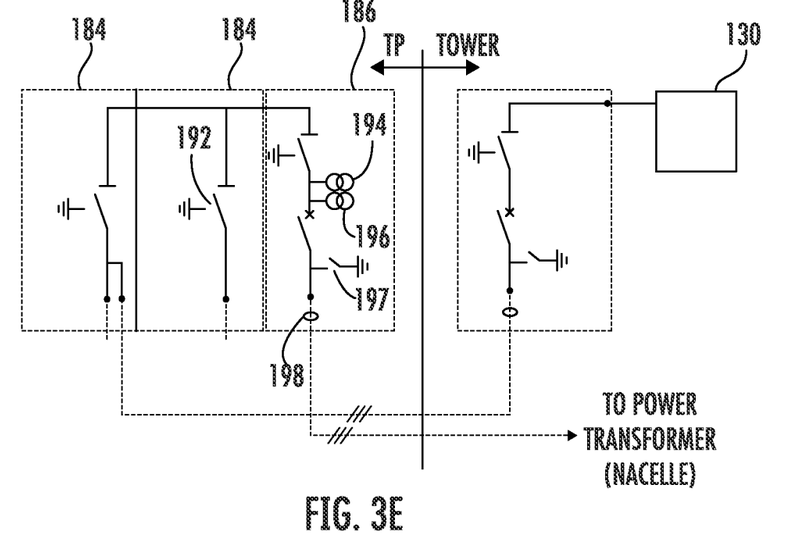

FIGS. 3D and 3E schematically illustrate two of the possible alternatives of connecting electric filter 130 to switchgear 180. In the example of FIG. 3D, an additional feeder bay 184 is integrated in switchgear 180. Other than that, the arrangement is very similar to the arrangement of FIG. 3C. The arrangement of FIG. 3D my be suitable e.g. when the wind turbine is not arranged at the end of the string in the wind farm. A feeder bay for the incoming line, and another feeder bay for the outgoing line are incorporated in the switchgear. As compared to the example of FIG. 3D, the size and weight of the switchgear may be increased. In examples however, arranging the filters in a middle of a string rather than at an end of the string may provide more effective damping or reduction of harmonics and other distortions.

FIG. 3E provides yet an alternative arrangement. In the example of FIG. 3E, the connection of filter 130 is not integrated in switchgear 180.

Figure 4A:
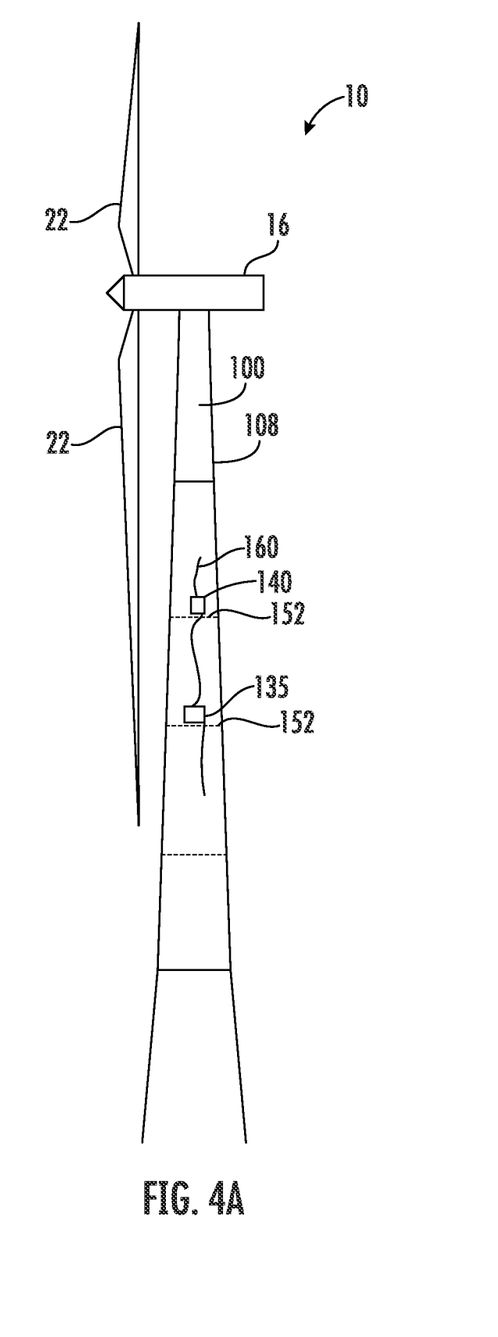
FIGS. 4A-4C schematically illustrate an example of an electric filter in a wind turbine tower.
Figure 4B:
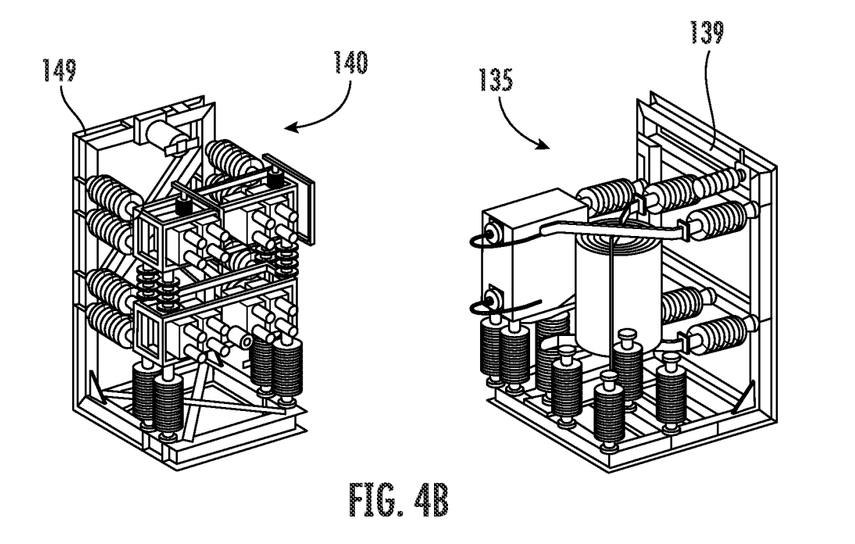
Figure 4C:
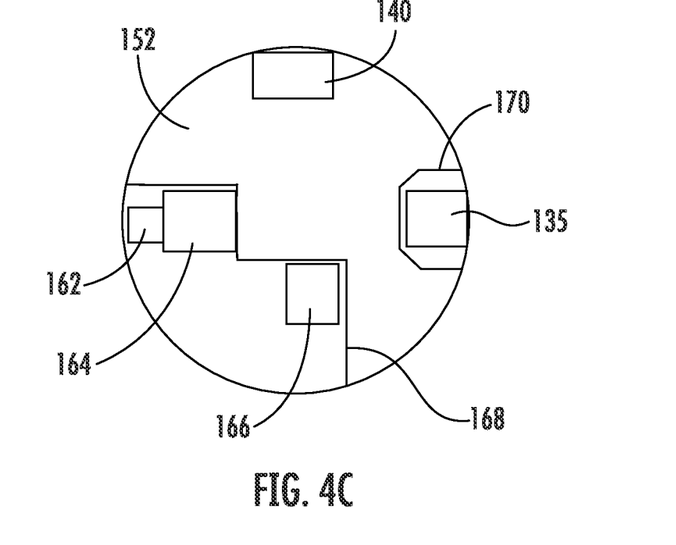

FIGS. 4A-4C schematically illustrate an example of a electric filter in a wind turbine tower 100. In the example of FIG. 4A, the wind turbine 10 has a nacelle 16 housing inter alia a generator. The wind turbine rotor comprises a plurality of blades 22. The generator in the nacelle may be operatively coupled to the wind turbine rotor through e.g. a gearbox. The nacelle may further comprise a power electronic converter and a main voltage transformer (not shown). Power cables 160 may extend from the nacelle 16 downwards through the tower and to a connection point to a wind farm grid.

The wind turbine tower 100 may include a plurality of tower sections stacked on top of each other. The tower sections may be e.g. tubular or cylindrical steel sections with a tower wall 108. At different heights along the wind turbine tower, one or more maintenance platforms 152 may be arranged. The platforms 152 may be arranged to allow maintenance personnel to carry out maintenance tasks, including inspection, repair, substitution of components and other. Wind turbine platforms 152 may be arranged at heights along the tower which are selected to provide access to specific components, like e.g. tower flanges, electrical components and other.

In examples of the present disclosure, one or more electric filters may be arranged inside the wind turbine tower 100. As mentioned before, an electric filter may be connected to each of the electrical phases. The electric filters for the different electrical phases may be arranged at different heights along the tower. Electric filters can thus be disposed inside the tower while maintaining sufficient space for e.g. elevators, ladders and other.

In examples (like in FIG. 3), the electric filters 130 may include different filter modules 135, 140. In examples, (like in FIG. 4a) one or more of the electric filters comprise at least two filter modules, wherein a first module 140 (e.g. capacitor banks) is arranged with a first platform within the wind turbine tower, and a second module 135 (e.g. resistor banks, and reactor banks) is arranged with a second platform within the wind turbine tower, i.e. the different modules of the same filter may be arranged at different heights. Particularly they may be arranged with tower platforms, such that access for maintenance is provided. In alternative examples (like in FIG. 4c), the first and second modules of the filter may be arranged with the same platform.

In some examples, the filter modules may be supported on tower platforms. In other examples, the filter modules may be attached to the wind turbine tower in the proximity of a platform. The filter modules may comprise a structural frame, and the structural frame may be attached to an inside wall of the wind turbine tower. In a particular example, the inside wall of the wind turbine tower may comprise a plurality of bosses for attachment of the structural frames of the filter modules. The structural frames may include suitable holes for receiving the bosses arranged with the wind turbine tower. The bosses may be welded to an inside wall of the wind turbine tower. Alternatively, the filter modules may be bolted to an inside of the tower wall. Alternative methods for attaching a frame of a filter module to an inside of the tower include the use of magnets or magnetic fasteners.

FIG. 4B schematically illustrates first module 140 with capacitor banks, and structural frame 149, and second filter module 135 with its structural frame 139. FIG. 4C provides a cross-section shape of a wind turbine tower at a height which may be slightly above a platform 152, i.e. the filter modules are not supported by the platform in this example. The platform 152 therefore does not need to be reinforced to be able to carry one or more filter modules. The filter modules are however arranged at such a height that maintenance personnel can access them from the platform when necessary.

As shown in FIG. 4C, a ladder 162 can allow maintenance personnel to move upwards and downwards between platforms. A service lift 164 may be arranged next to ladder 162, and in some examples may be guided by ladder 162. A maintenance zone 166 is also schematically indicated.

It should be clear that FIG. 4C provides just one example. The arrangement of filter modules may be different at different platforms, depending on the space available. The filter modules may be distributed over the height of the tower and arranged with different platforms, in order to ensure sufficient physical spacing, allow sufficient heat removal or cooling, and provide sufficient space for maintenance personnel to access the nacelle.

The platform 152 may comprise protective fences 168 to provide a restricted area around the filter modules. It should be borne in mind that the electric filter may be active and energized even if the wind turbine itself is not operational to provide harmonics damping in the wind park grid. I.e. a particular wind turbine may be stopped for maintenance or due to a fault. However, other wind turbines within the same wind farm, may still be fully operational. Even wind turbines along the same string of the wind farm may be operational. Therefore, the electric filters within the stopped or parked wind turbine may still need to be operational as well.

Other forms of shielding than fences may also be used. In some examples, the filters or filter modules may be shielded. In the example of FIG. 4C, protective shielding 170 is provided around filter module 135.

Depending on the specific electrical arrangement, a minimum safety distance for personnel around the filter modules may be determined. Depending on such a safety distance, the filter modules may be distributed over the available cross-sectional area.

Figure 5:
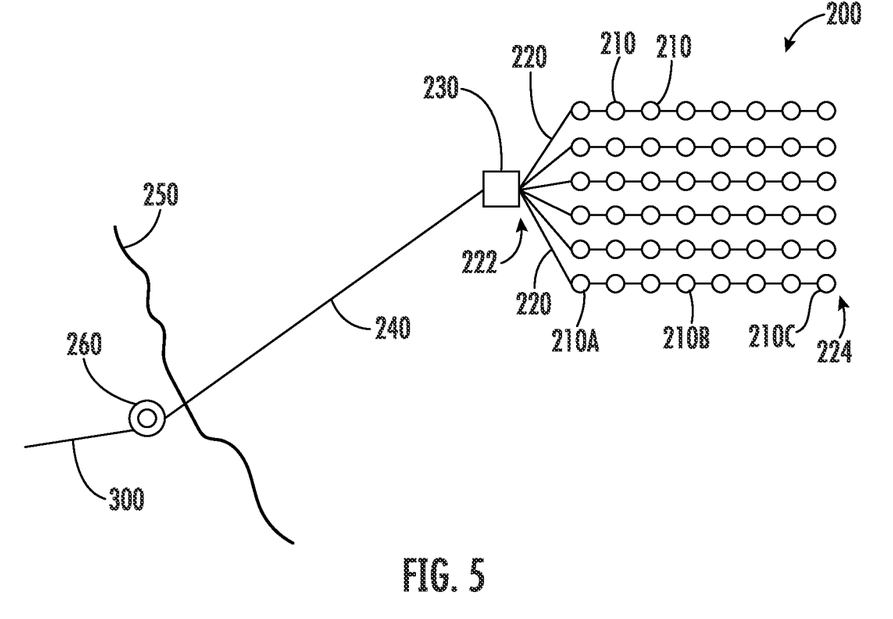
FIG. 5 schematically illustrates an example of an offshore wind park.

FIG. 5 schematically illustrates an example of an offshore wind park 200. In a further aspect, of the present disclosure a wind park 200 is provided, which comprises a substation 230 with a common connection point. The wind park 200 comprises one or more wind farm strings or 220 in parallel connected to the common connection point, having a first end 222 at or near the common connection point and a second opposite end 224, and including a plurality of wind turbines 210 between the first end 222 and the second end 224. Wind farm strings may also be called "lines" or "buses". One or more of the wind farm strings 220 may comprise a wind turbine as or similar to the wind turbine examples hereinbefore described, in particular with an electric filter arranged with or within a wind turbine support structure, like the wind turbine tower. The electric filter may be connected to a high voltage side of the main voltage transformer of the wind turbine.

In examples, each of the wind farm strings 220 may comprise such a wind turbine including an electric filter.

In the bottom string 220, a first wind turbine 210A is arranged as the first wind turbine of the string. Wind turbine 210C is the last wind turbine of the string. And wind turbine 210B is arranged substantially centrally along the string. In this particular example, all strings have the same length and the same number of wind turbines. It will be clear that this does not need to be the case, and strings in a wind farm may have different lengths (and thus different capacitances), and different numbers of wind turbines.

In examples, multiple wind turbines in accordance with any of the examples disclosed herein including one or more electric filters may be arranged along one of the strings, whereas for other strings, a single wind turbine (e.g. the first wind turbine 210A, the last wind turbine of the string 210C or a wind turbine 210B in between) with electric filters may be provided. In examples, an additional electric filter may be arranged with substation 230. In other examples, no electric filters may be arranged with substation 230.

It should be clear that even though the strings are depicted as if they were physically substantially parallel to each other, the strings may be arranged in a variety of ways depending on the lay-out of the wind farm. The string may e.g., extend radially away from the common connection point.

In yet a further aspect, a wind farm is provided which comprises a substation 230 with a common connection point, and one or more parallel wind farm strings 220 connected to the common connection point, having a first end 222 at or near the common connection point and a second opposite end 224, and including a plurality of wind turbines 210 between the first end and the second end, wherein each of the wind farm strings 220 includes at least one wind turbine with an electric filter connected at a high voltage side of a main transformer of the wind turbine.

The wind farm may be an offshore wind farm as in FIG. 5. The substation 230 may include a high voltage transformer, and be connected to a high voltage transmission line 240, e.g., a HVAC or HVDC transmission line. Such a high voltage transmission line may be several kilometres long, e.g., 5 km, 10 km or more. The high voltage transmission line may be connected to a point of common coupling (PPC) 260 with the mainland electrical grid 300. Reference sign 250 illustrates a coastline.

In examples, the wind turbine with an electric filter may be arranged at or near the second end of the wind farm strings. If an "end-of-line" wind turbine is selected, this may be beneficial in terms of connection with the wind turbine's switchgear. But within the scope of the present disclosure, also a wind turbine at a different location, e.g., like centrally along a string, like wind turbine 210B may include an electric filter.

Even though in the present disclosure, all wind turbines and wind farms were illustrated and explained to be offshore wind turbines and wind farms, it should be clear that the same or similar arrangement can be used onshore as well.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A wind turbine comprising:
a wind turbine rotor with a plurality of blades, the wind turbine rotor supported on a support structure that includes a wind turbine tower;
a generator operatively coupled to the wind turbine rotor;
a power electronic converter configured to convert electrical power generated by the generator to a converted AC power of predetermined frequency and voltage;
a main wind turbine transformer having a low voltage side and a high voltage side for transforming the converted AC power to a higher voltage; and
at least one electric filter connected to the high voltage side of the main transformer;
wherein the electric filter is arranged in the wind turbine tower;
wherein the electric filter comprises at least two filter modules, wherein a first module is arranged at a first platform within the wind turbine tower, and a second module is arranged at a second platform within the wind turbine tower;
wherein the first module comprises a reactor bank and a resistor bank connected in parallel, and the second module comprises a capacitor bank, the second module connected in series with the first module.

2. The wind turbine of claim 1, wherein the electrical power generated by the generator has a plurality of electrical phases, and
the at least one electric filter comprises a plurality of electric filters;
wherein each of the electric filters is assigned to a respective one of the electrical phases.

3. The wind turbine of claim 1, wherein each of the first and second platforms comprises a protective fence that defines a restricted area around a respective filter module of the first and second filter modules.

4. The wind turbine of claim 1, wherein the first and second filter modules each further comprise a structural frame, and wherein each structural frame is attached to an inside wall of the wind turbine tower.

5. The wind turbine of claim 4, wherein the inside wall of the wind turbine tower comprises a plurality of bosses and the structural frames are attached to the bosses.

6. The wind turbine of claim 1, wherein the capacitor bank is connected to the high voltage side of the transformer.

7. The wind turbine of claim 1, wherein the electric filter is connected to an electrical grid via a switchgear.

8. The wind turbine of claim 1, wherein the wind turbine is an offshore wind turbine.

9. A wind farm comprising:
a substation with a common connection point;
two or more parallel wind farm strings connected to the common connection point, the wind farm strings each having a first end at or near the common connection point, a second end opposite the first end, and a plurality of wind turbines between the first end and the second end; and
wherein one or more of the wind farm strings comprise at least one wind turbine according to claim 1.

10. The wind farm according to claim 9, wherein each of the wind farm strings comprises at least one wind turbine according to claim 1.

11. The wind farm according to claim 10, wherein, for each of the wind farm strings, the at least one wind turbine according to claim 1 is arranged at or near the second end of the wind farm string.

12. The wind farm according to claim 9, wherein the substation is configured to operate without a harmonic filter.

\* \* \* \* \*